(No Model.) 4 Sheets—Sheet 1.

G. H. ELLIS & J. F. STEWARD.
TWINE SPINNING MACHINE.

No. 568,299. Patented Sept. 22, 1896.

Witnesses
Arthur Johnson.
Frank G. Middlecauff

Inventors
George H. Ellis
John F. Steward

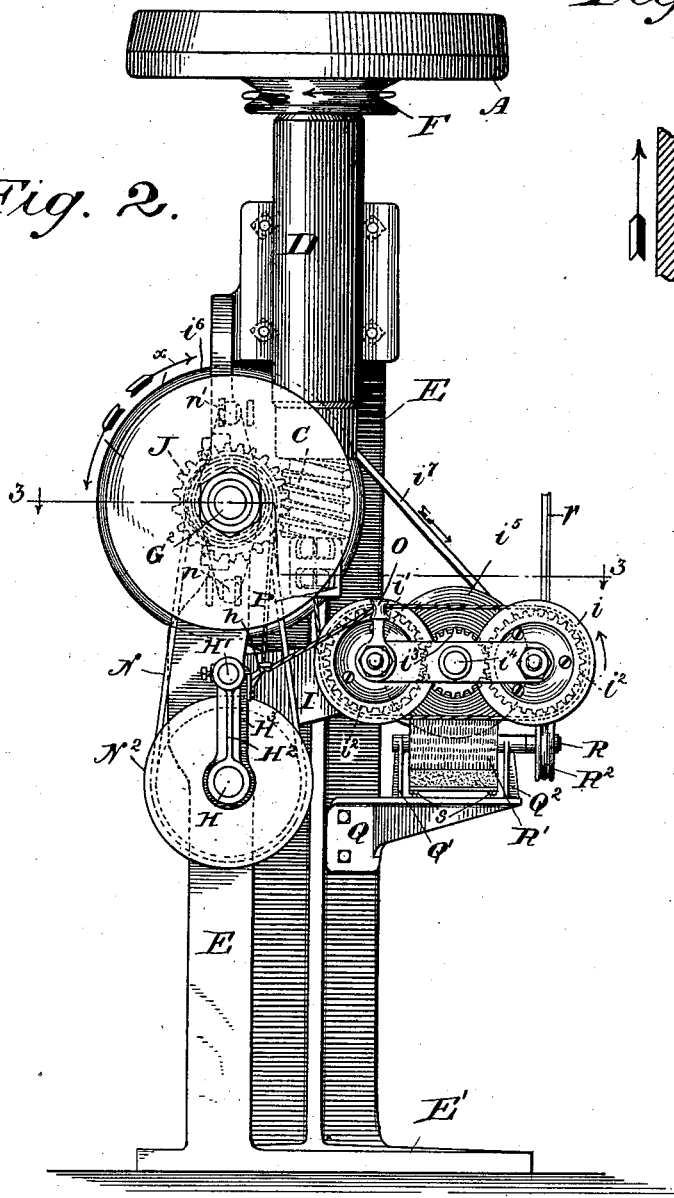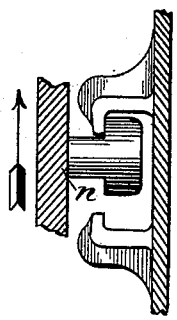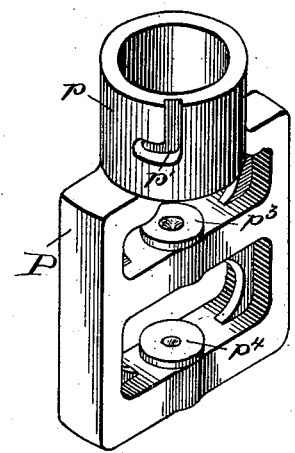

(No Model.) 4 Sheets—Sheet 3.
G. H. ELLIS & J. F. STEWARD.
TWINE SPINNING MACHINE.
No. 568,299. Patented Sept. 22, 1896.
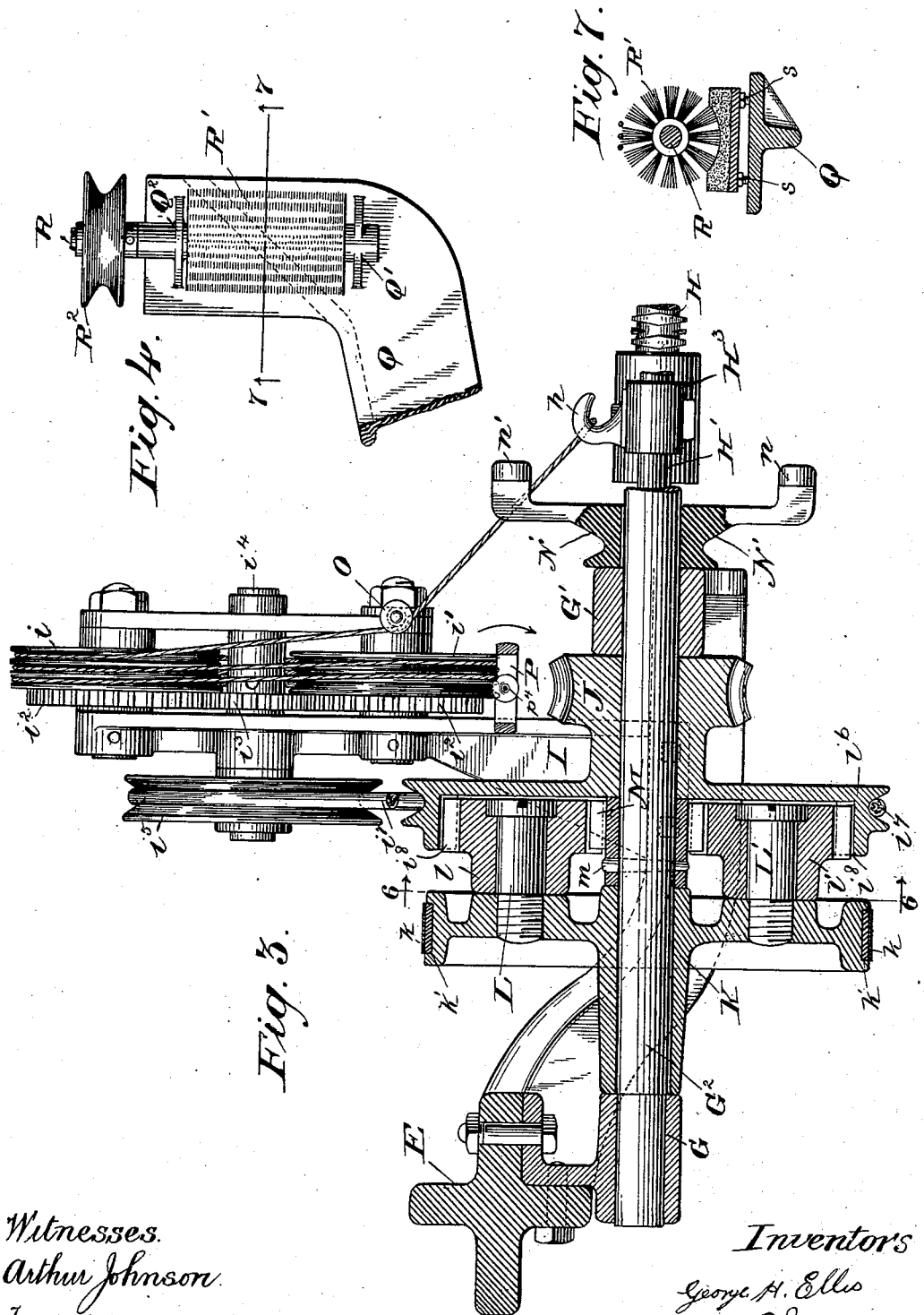
Witnesses.
Arthur Johnson.
Frank G. Middlekauff.
Inventors
George H. Ellis
John F. Steward (No Model.) 4 Sheets—Sheet 4.

G. H. ELLIS & J. F. STEWARD.
TWINE SPINNING MACHINE.

No. 568,299. Patented Sept. 22, 1896.

Witnesses
Arthur Johnson
Frank G. Middlekauff

Inventors
George H. Ellis
John F. Steward

UNITED STATES PATENT OFFICE.

GEORGE H. ELLIS AND JOHN F. STEWARD, OF CHICAGO, ILLINOIS, ASSIGNORS TO THE WILLIAM DEERING & COMPANY, OF SAME PLACE.

TWINE-SPINNING MACHINE.

SPECIFICATION forming part of Letters Patent No. 568,299, dated September 22, 1896.

Application filed April 17, 1893. Serial No. 470,777. (No model.)

*To all whom it may concern:*

Be it known that we, GEORGE H. ELLIS and JOHN F. STEWARD, of Chicago, in the county of Cook and State of Illinois, have invented certain new and useful Improvements in Machines for Spinning Twines, particularly twines from strips of paper, of which the following is a full description, reference being had to the accompanying drawings, in which—

Figures 1, 8, 9, 13:
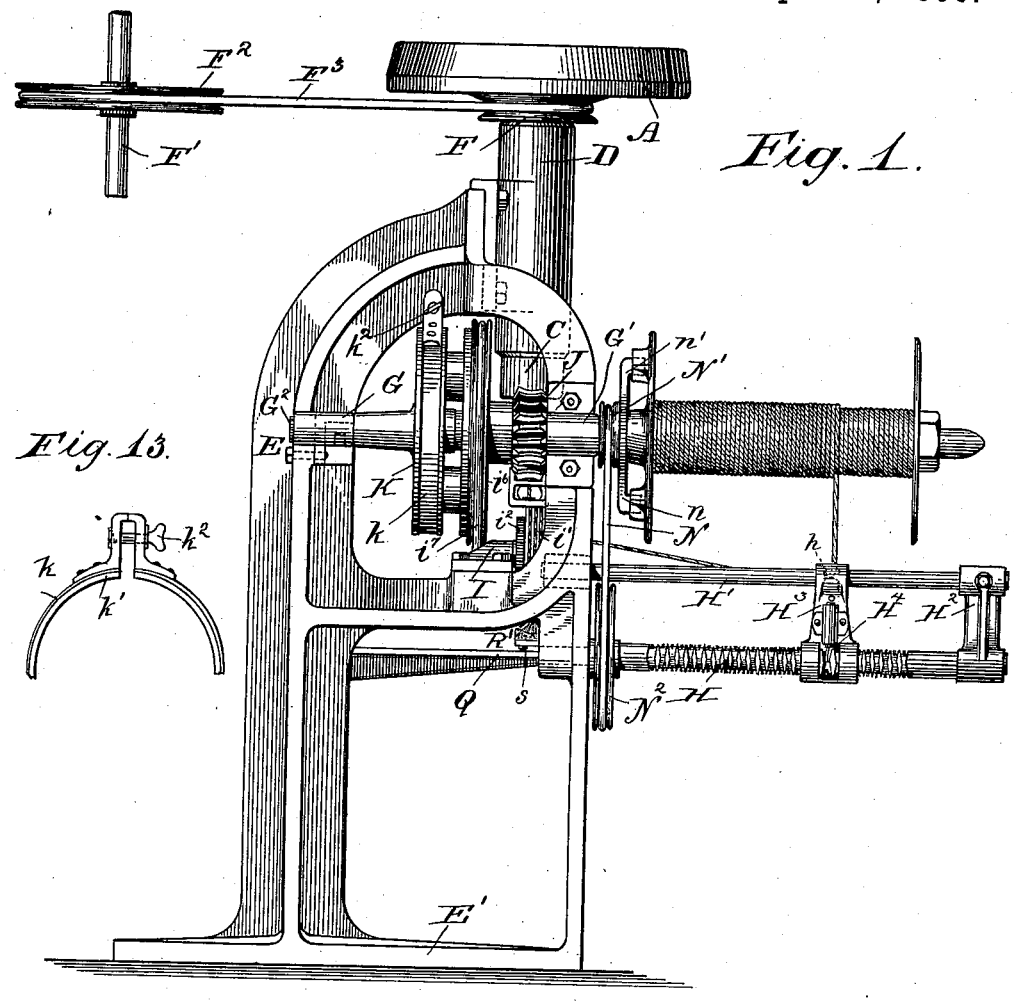
Figure 5:
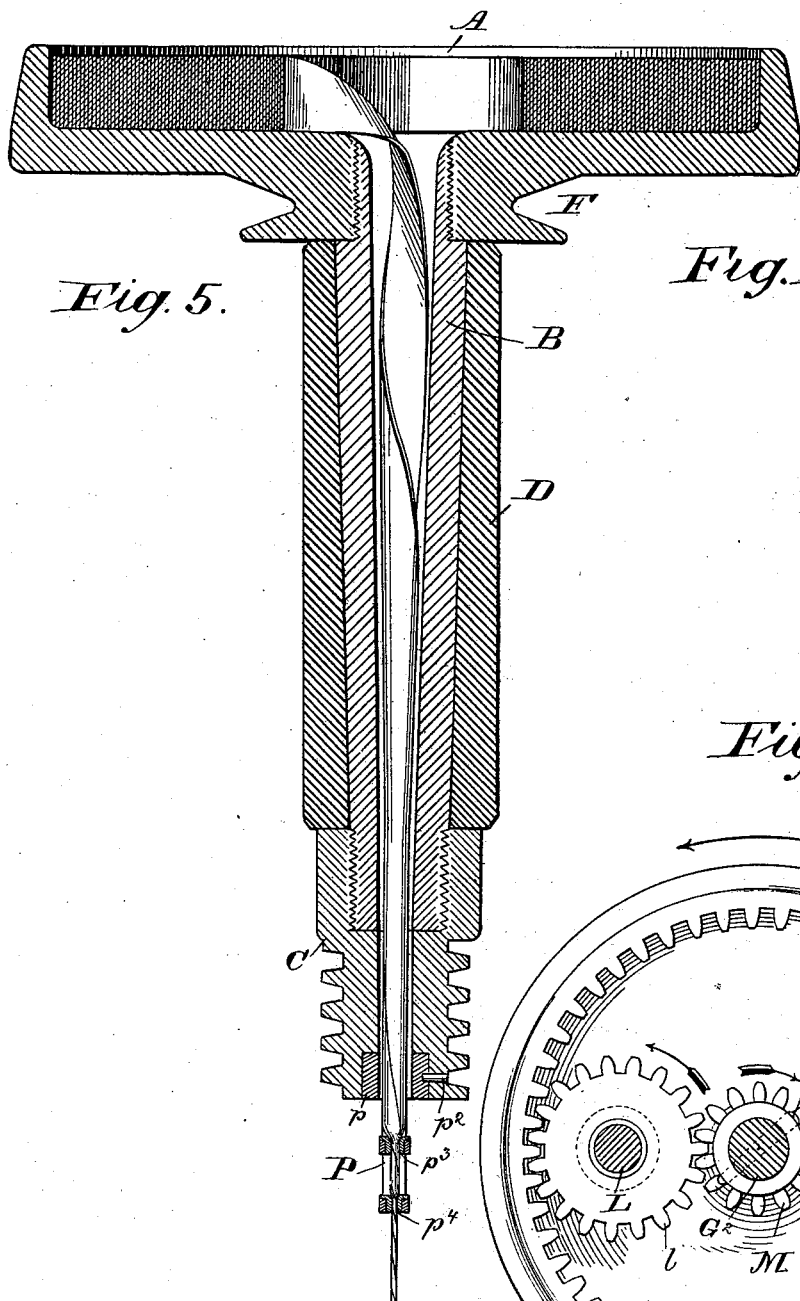
Figure 12:
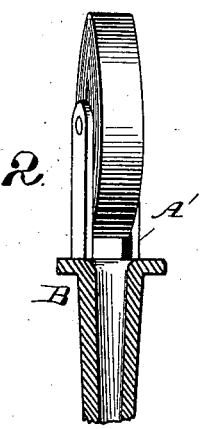
Figure 6:
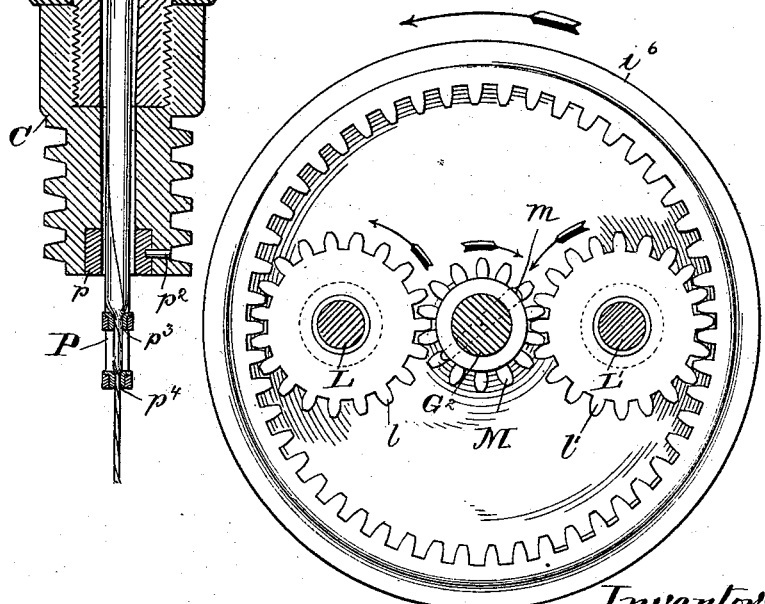

Figure 1 is a side elevation of our complete machine; Fig. 2, a front elevation of the same; Fig. 3, a sectional view on the line 3 3 of Fig. 2. Fig. 4 is a detail of the brushing device for applying the coating to the surface of the twine. Fig. 5 is a sectional view of the spinning-arbor and receptacle for the disk of paper to be spun. Fig. 6 is a detail of the gearing that serves to control the speed of the capstan-wheels. Fig. 7 is an end view of the twine-brush. Fig. 8 is a detail of the traversing twine-guide. Fig. 9 is a sectional side view of the same. Fig. 10 is a detail of the twine-former. Fig. 11 is a detail showing the means for locking the spools to the spindle upon which it is mounted. Fig. 12 is a reduced view of a paper-disk holder that may be used. Fig. 13 is a detail of the brake of the friction-wheel.

Our machine is adapted to carry out a method of making twine that forms the subject-matter of a patent granted to John F. Steward, No. 500,627, issued July 4, 1893; and it consists in providing a rotary holder for the paper that is first rolled into the form of a disk. As far as our present machine is concerned, however, it will operate whether the twine be formed by the method referred to or by drawing from the outside of a coil, as shown in Fig. 12.

We preferably provide a receptacle A in which the disk, formed by rolling the strip of paper, may lie, the said receptacle being mounted upon the top of a mandrel B. We screw the mandrel to the receptacle, but it may be secured in any other manner. The receptacle is provided with a central opening, and the mandrel is made in the form of a tube, down through which the strip of paper is drawn. For the purpose of transmitting movement to other parts of the machine the mandrel is provided at its lower end with the screw C, also screwed on the mandrel for the purpose of detachment, and in order to allow of putting the mandrel in its supporting-sleeve D, that is secured to the upper portion of the main frame E by means of suitable bolts. This frame has a base E' suited to rest upon a base upon which several of its mates may also stand when placed side by side, in battery form, in order that one person may attend several of the machines.

We form upon the receptacle A a sheave F, and in suitable bearing near the machine place a shaft F', having the sheave $F^2$, and around the two sheaves throw the band $F^3$. By this means the receptacle and in turn all other moving parts are actuated.

Upon the main frame, in the bearings G and G', is supported the shaft $G^2$, and upon this the spool for the reception of the newly-spun twine is placed and thus rotated by means of a friction-wheel, shown in the present exemplification of our invention as a friction-wheel that regulates the movement of the shaft, as will soon be described. Secured also in bearings in the main frame is the reversing-screw H. Over this screw is the bar H'. This bar, as well as the screw H, lie immediately under the spool, the bar serving as a support, through the instrumentality of the connecting-hanger $H^2$, for the outer end of the screw, and also as a guide for the traversing twine-guide, consisting of the hook $h$, mounted upon the carrier $H^3$. Upon an arm I, secured to the main frame, are mounted the capstan-wheels $i$ and $i'$. Each is provided with a gear-wheel $i^2$. Between these wheels and having the gear $i^3$ is the shaft $i^4$, provided with the sheave $i^5$. Around this latter sheave that revolves loose on the shaft $G^2$ and the sheave $i^6$ is thrown the band $i^7$, by which means the capstan-wheels are given rotation in the proper direction to draw the twine downward from the spinner.

As the capstan-wheels must rotate at a definite speed relative to that of the spinner they are connected directly thereto in the following manner: Loosely placed upon the shaft $G^2$ is the worm-wheel J, adapted to mesh with the screw C of the spinning-arbor B, so that as the latter is rotated the said wheel is given movement in the direction indicated by the arrow X of Fig. 2. In one piece with the worm-wheel J is the sheave $i^6$. By means of the screw C and worm-wheel J the speed of the sheave $i^6$ is so much reduced that the capstan-wheels have a movement sufficient to draw the twine at such a rate that it may receive the right number of twists per foot. The course of the twine after leaving the spinner may be followed in full and dotted lines in Fig. 2, from the mandrel downward beneath the wheels $i$ $i'$, then over, and in this case three convolutions are made, as shown in Fig. 3, thence around the guiding-sheave O to the guiding-hook $h$, and upward to the spool. As the spool, however, must rotate no faster than required to take the twine from the capstan-wheels and as its size from the beginning is constantly varying we show a friction device for giving it movement, and so provide that its normal speed shall be sufficient to wind all of the twine that is delivered to it even when at its smallest size.

Turning to Fig. 3 it will be observed that loosely placed on the shaft $G^2$ is the friction-wheel K, grooved at its periphery and having around it the band $k$, preferably made of steel and lined with a leather strap $k'$. The ends of this band are brought near to each other, as shown in detail in Fig. 13, and in order that the friction produced by the band may be regulated an adjusting-screw $k^2$ is provided, the upreaching arm of the band through which the screw passes resting against the main frame, as shown in Fig. 1, and by it the said friction-band is prevented from rotating. Considering the friction-wheel K for the moment non-rotatable it will be easy to understand how it aids in giving the spool rotation. Into one side are screwed the studs L and L', and upon these are the planet-gears $l$ and $l'$, adapted to mesh into the teeth of the internal gear $i^8$ on the shaft $i^6$. Secured to the shaft $G^2$ by means of the pin $m$ is the pinion M, into which the gears $l$ and $l'$ mesh. The wheel $i^6$, receiving its motion from the spinning-mandrel, through the instrumentality of the worm-wheel, which may be considered as forming one part of it, imparts motion in turn to the intermediate gears $l$ and $l'$ and they rotating, as we are now considering them, upon the fixed studs L and L', in turn impart motion to the pinion M by which the spool-shaft is rotated. Secured to the said shaft are the arms $n$ and $n'$, adapted to be hooked by the usual means into slots on one of the heads of the spool, as shown in Fig. 11. By the means described the spool will be given rotations at a sufficient rate to wind the twine upon it when smallest, but as the convolutions of twine increase the size, the shaft must in some manner be permitted to reduce its speed. This is accomplished by adjustment of the screw $k^2$. With the band so loose that the wheel K may give way in it the result is that the studs which it supports and which carry the planet-gears give way, resulting in a failure on the part of said planet-gears both to receive and transfer the motion that they otherwise would receive from the internal gear that actuates them. The screw H receives its motion from a band N, thrown around the sheave N' upon the spool-shaft, and the sheave $N^2$, secured near the end of the screw. Driven as the screw is from the spool-shaft its rate of speed is controlled thereby, so that whether the spool rotates as rapidly as when beginning to receive twine, or slowly as when it becomes filled therewith, the said twine is laid regularly. Within the guide $H^3$ is pivoted the switch $H^4$. This is adapted in a well-known manner to be carried along the screw and at the end thereof be turned to take its backward course driven by that portion of the screw that is reversed. O is a guide-sheave around which the twine is drawn while passing from the capstan-wheels to the guiding-hook $h$.

In Fig. 10 is shown the former P, consisting of a hub $p$, adapted to be inserted in the lower end of the mandrel B and to be secured therein by means of the slot $p'$, that starting at the upper end of the hub passes downward and then turns in a circumferential direction. Within the lower end of the mandrel is the pin $p^2$. The pin passes a little distance into the bore of the mandrel and in such position that when the hub of the former is passed upward its end rests in the slot $p'$, and when the said hub is turned on its axis of rotation the circumferential portion of the slot passes onto the pin and prevents its withdrawal. The circumferential portion of the slot is given such a direction that as the spinner rotates the friction of the twine therein tends to hold the end of the slot to the pin. A set-screw may be used in lieu of this device, but the bayonet form of securement is found adequate. The former may have one or more openings. We have chosen to provide it with two $p^3$ and $p^4$, preferably made of hardened steel.

The principle involved in collapsing the tube by means of gradual reduction is that shown, described, and claimed in the sole application of George H. Ellis, filed on or about March 20, 1893, Serial No. 466,958, and forming, as it does, no part of the present invention, need not be described. In order to prevent abrasion of the paper during the operation of tying the knots when used in binding grain by automatic means, it is found desirable to coat the surface of the twine with a lubricant, one that shall penetrate the cord but little. For this purpose dry plumbago serves a good purpose; so, also, does any wax that will serve as a slight lubricant, paraffin serving a good purpose. In order to apply the wax or any lubricant or preservative to the surface of the twine, we provide a brush the bristles of which shall move in contact with a cake of wax or a quantity of plumbago, as the case may be, and also in contact with the twines as they pass around the capstan-wheels.

Outreaching from the main frame is the bracket Q, having upreaching standards Q' and Q², forming at their upper ends journal-bearings for the shaft R, upon which is the cylindrical brush R'. Upon the same shaft is the sheave R², and around this, from any convenient source, is thrown the band r. Beneath the brush and in close contact with it is located the lubricant, preferably paraffin, upon a table having adjustment-screws s s. The brush is designed to rotate rapidly and lap up the wax or lubricant and carry it to the strands of twine. We find that a wax made of paraffin and plumbago serves an excellent purpose.

What we claim as our invention, and desire to secure by Letters Patent, is—

1. In a twine-spinning machine, a rotary receptacle adapted to receive a paper disk composed of a strip or ribbon wound into a coil, an opening in said receptacle coincident with its axis of rotation and through which the paper disk may be uncoiled from the center, a hollow mandrel secured axially to said receptacle and rotating therewith, and means for drawing the paper from the receptacle through the mandrel; substantially as described.

2. In a twine-spinning machine, a rotary receptacle adapted to receive a disk of paper formed by winding a strip or ribbon into a coil, an opening in said receptacle coincident with its axis of rotation and through which the paper disk may be unwound from the center, a hollow mandrel secured at one end axially to the receptacle and rotating therewith, a former at the other end of the mandrel for winding the paper strip into twine, and means for drawing the paper from the receptacle through the mandrel and former; substantially as described.

3. In a twine-spinning machine, a rotary receptacle adapted to receive a disk of paper formed by winding a ribbon or strip into a coil, an opening in said receptacle coincident with its axis of rotation, and through which the paper disk may be unwound from the center, a hollow mandrel secured axially to said receptacle and rotating therewith, and pulleys or wheels at the other end of the mandrel which serve to draw the paper from the receptacle through the mandrel, said wheels being driven by gearing connecting them with the mandrel; substantially as described.

4. In a twine-spinning machine, a hollow mandrel through which a strip of paper may be drawn and formed into a tube, a reservoir adapted to receive a roll of paper, the axis of which is coincident with that of the said mandrel, and a former adapted to form the said paper into a tube, the said mandrel carrying the said reservoir and said former, one at each end thereof; being suitably supported in a bearing located between the said reservoir and said former; and being provided with suitable means for receiving rotation, combined with the screw C, the capstan wheel or wheels, the worm-wheel J having the internal gear as one part therewith and adapted to transmit rotation from the said screw to the said capstan-wheels, the friction-wheel K and the spool-shaft G² having secured thereto the pinion M, substantially as described.

5. In a twine-spinning machine, the hollow paper-tube-forming mandrel B, the receptacle A mounted thereon, the screw C and former P also thereon, in combination with the worm-wheel J, having the grooved sheave $i^6$ integral therewith, and the capstan-wheels, suitably connected with the said sheave as to be driven thereby, substantially as described.

6. In a twine-spinner, the paper-tube-forming mandrel having the receiver at one end and the former at the other end, and having the screw C thereon, in combination with the shaft G², worm-wheel J loosely mounted thereon and adapted to mesh into the said screw C, the internal gear $i^8$, the pinion M, and the friction-wheel K, carrying one or more studs, and one or more intermediate pinions on said studs, adapted to mesh into the internal gear and into the pinion M and thus give rotation to the spool supported on the said shaft, said friction-wheel being provided with a suitable brake, substantially as described.

7. In a twine-spinning machine the hollow tube-forming mandrel, having the receiver and the former thereon, and having also the screw C, in combination with a spool-shaft, the worm-wheel J loosely mounted thereon, the sheave $i^6$ suitably connected to the worm-wheel J, having an internal gear, the friction-wheel K, loosely mounted upon the same shaft and carrying one or more intermediate pinions adapted to mesh into the said internal gear and with the pinion M upon the said shaft, and a suitable brake to regulate the resistance to the movement of the said friction-wheel, substantially as described.

8. In a twine-spinner, the hollow mandrel having the receptacle at one end and the former and the screw C at the other, in combination with the wheel $i^6$ geared to the screw C and connected with the capstan-wheels, the internal gear $i^8$, the worm-gear J, the pinion M fixed on the spool-shaft, the friction-wheel K, and a suitable brake for controlling the motion thereof, said wheel K carrying pinions located and arranged to gear into the internal gear and the pinion M; substantially as described.

9. In a twine-spinner, in combination with the twisting devices means for imparting rotation to said devices, the spool-shaft having the pinion M secured thereto, the sheave $i^6$ mounted loosely upon the said shaft, an internal gear $i^8$, a friction-wheel carrying intermediate gears, meshing with the said internal gear and the said pinion M, the sheave N' upon the said spool-shaft, a traversing twine-guide, and a sheave N² adapted to receive rotation from the said sheave N' and transmit it to the reversing-screw H of the said guide, substantially as described.

10. In a twine-spinning machine the combination of the spinning-mandrel, having thereon the receptacle A, the capstan-wheels, the spool-driving mechanism means for giving the said mandrel rotation and the traversing twine-guide, all adapted to receive movement directly from the said spinning-mandrel, substantially as described.

GEORGE H. ELLIS.
       JOHN F. STEWARD.

Witnesses:
 ARTHUR JOHNSON,
 MANUEL B. HART.